United States Patent [19]

Ecker et al.

[11] Patent Number: 4,739,680

[45] Date of Patent: Apr. 26, 1988

[54] APPARATUS FOR SECURING SCREW BOLTS AGAINST ROTATION

[75] Inventors: Karl-Heinz Ecker, Erkelenz; Helmut Henschenmacher, Brachelen, both of Fed. Rep. of Germany

[73] Assignee: Wirth Maschinen—und Bohrgerate—Fabrik GmbH, Erkelenz, Fed. Rep. of Germany

[21] Appl. No.: 939,682

[22] Filed: Dec. 9, 1986

[30] Foreign Application Priority Data

Dec. 11, 1985 [DE] Fed. Rep. of Germany ... 8534790[U]

[51] Int. Cl.$^4$ ............................................... B25B 9/00
[52] U.S. Cl. ............................................ 81/13; 81/55
[58] Field of Search ............................. 81/13, 55, 56

[56] References Cited

U.S. PATENT DOCUMENTS 2,102,897 12/1937 Holhut ................................... 81/13
3,916,734 11/1975 Sawan .................................... 81/55

FOREIGN PATENT DOCUMENTS 1220097 1/1960 France ................................... 81/13

Primary Examiner—Frederick R. Schmidt
Assistant Examiner—Robert Showalter
Attorney, Agent, or Firm—Holman & Stern

[57] ABSTRACT

The apparatus prevents undesirable rotation of screw bolts or the like provided at their ends with spanner working surfaces, in particular large screw bolts. Adapters are positioned individually on the said ends of the screw bolts and each has opposing surfaces adapted to the spanner working surfaces of a screw bolt. Carriers are pushed onto the adapters and each have internal teeth which can be brought into mesh with external teeth of the adapter. A holder mounts least two carriers with slight angular mobility, at a spacing corresponding to the axial interval between screw bolts.

12 Claims, 3 Drawing Sheets

APPARATUS FOR SECURING SCREW BOLTS AGAINST ROTATION

BACKGROUND TO THE INVENTION

1. Field of Invention

The invention relates to apparatus for preventing undesirable rotation of screw bolts or the like provided at their ends with spanner working surfaces, in particular for large screw bolts.

2. Description of Prior Art

Cases arise in which moments which tend to turn the screw bolt act indirectly or directly on a screw bolt, even though this is undesirable. The same applies, in particular, to screw bolts which are designed as gudgeons and are screwed into receiving threads in a base member. If a nut located on the screw bolt is to be unscrewed, it may jam and tend to entrain the screw bolt. Such problems arise, among other things, with large screw bolts of the type used for lid seals for pressure vessels and the like.

SUMMARY OF THE INVENTION

An object of the invention is to provide a practical, easily manageable and simple apparatus with which undesirable rotation of screw bolts can be prevented, in particular in applications of the type mentioned above or in similar applications. Further problems with which the invention deals are revealed in the respective explanation of the solution indicated.

The present invention provides apparatus for preventing undesirable rotation of screw bolts or the like provided at their ends with spanner working surfaces, in particular for large screw bolts, comprising several adapters which can be positioned individually on the ends of the screw bolts and of which each has opposing surfaces adapted to the spanner working surfaces of a screw bolt as well as external teeth, by carriers which can be pushed onto the adapters and each have internal teeth which can be brought into mesh with the external teeth of the adapter, and by a holder in which at least two carriers are accommodated at a center-to-center spacing corresponding to the axial interval between screw bolts, with slight angular mobility about its longitudinal axis.

Important constituents are the holder, at least two carriers connected thereto, and a number of individual adapters.

Screw bolts can be secured very simply in pairs against undesirable rotation by such an apparatus. A moment occurring on a screw bolt and attempting to turn it is reliably absorbed by the apparatus an the torque supports thus provided. According to the application and the requirements arising, such an apparatus can remain permanently in position and, in this case, can be substantially a constituent of a corresponding arrangement or device, or the apparatus can be used only when needed and for as long as necessary for the respective operation to be carried out, for example the unscrewing of a nut.

In an advantageous embodiment, the carriers extend through an opening in the holder, stops for limiting the angular mobility being provided in this region. The stops can be formed, in particular, by internal surfaces of the actual opening. The opening preferably has the form of a polygon, in which case the carrier or a projection thereof has a corresponding shape with somewhat smaller dimensions.

Resilient centering means which hold the carrier relative to the holder in a rest or starting position are provided in a further embodiment of the apparatus. Such centering means can be of various designs. In an advantageous design, spring-loaded thrust-bearing elements which rest on internal surfaces of the holder are provided on or in the carrier.

It is advantageous if the adapters can be connected indirectly or directly to the holder or can be coupled thereto in such a way that they can be transported together with the holder and the carriers, in particular when the apparatus is removed.

Further advantageous embodiments of the apparatus are also mentioned in the sub-Claims.

Details, features, and advantages of the invention will also be revealed in the following description of embodiments, in the associated drawings, and in the claims.

DETAILED DESCRIPTION OF PREFERRED EMBODIMENT

Figure 1:
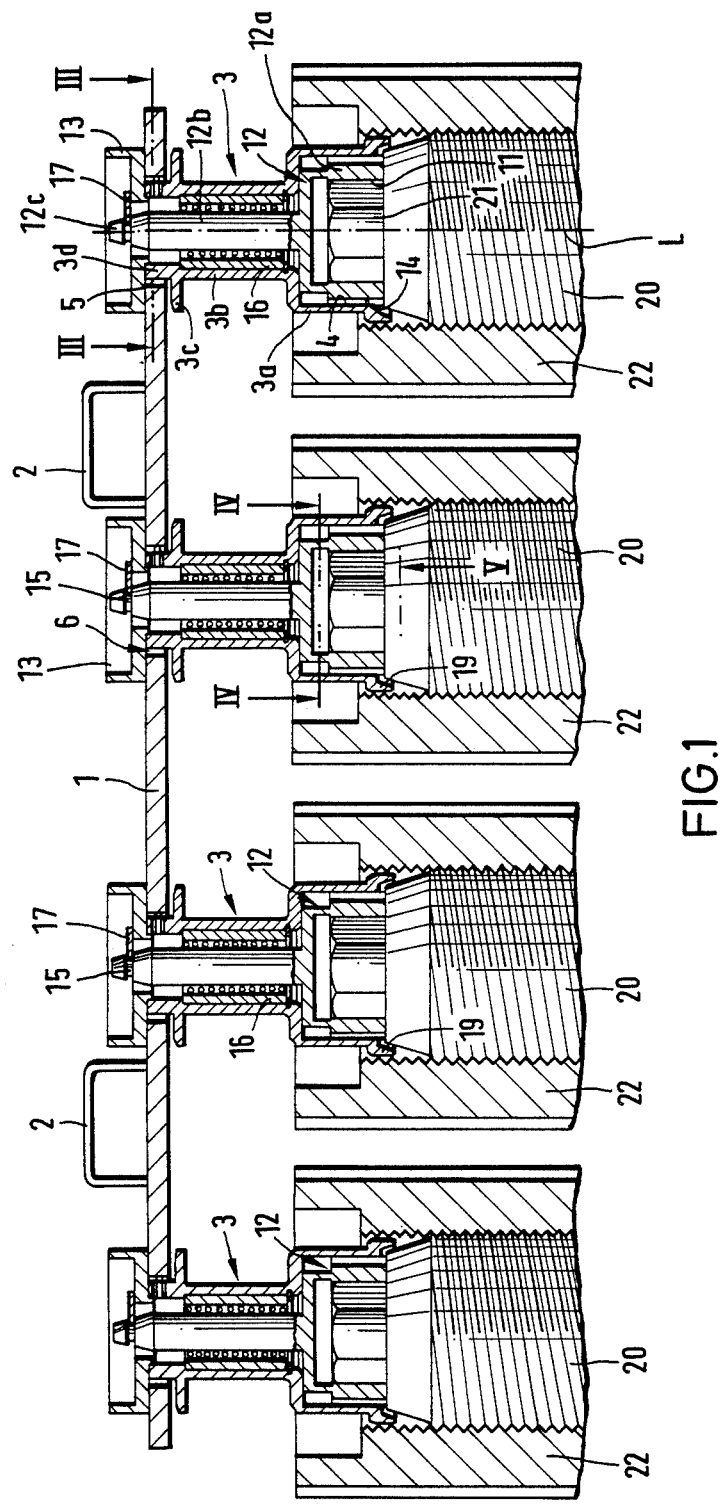
FIG. 1 shows an embodiment of the apparatus in a section along the line I—I in FIG. 2.

FIG. 1 shows a particularly important application of the apparatus, more specifically with screw bolts, expansion screws, tie-rods, or the like of the type used for lid closures or flange connections for reactor vessels and pressure vessels and in other high stress connections, in particular like stud bolts which are screwed with their lower ends in a receiving screw thread of a base member and penetrate through holes in a lid, flange, or the like. A fixing nut is screwed onto a corresponding screw thread of the bolt and lies againt the lid, flange, or the like. Such screw bolts are usually prestressed with a particular apparatus, i.e. expanded with a specific tensile load before the fixing nut is finally screwed on. After removing the axial tensile load, a tension remains so that the fixing nut not only fits snugly on the lid, flange, or the like but also presses it against its support.

FIG. 1 shows the respective upper parts of screw bolts 20 of the above-mentioned type, which are screwed with their lower ends into a base member (not shown), for example a reactor vessel. At their upper end they have spanner working surfaces, in this case in the form of an external hexagon 21. A nut 22 is screwed onto an upper thread of the screw bolt 20 and acts as a contact for a (e.g. hydraulic) tightening or expansion device located below it. The tightening or expansion device can contain one or more pistons which can be moved upwards in cylinders, the uppermost piston acting on the contact nut 22.

When the screw tightening device is to be removed from the cover or the like after producing the connection by finally twisting on the fixing nuts (not shown), the upper contact nuts 22 firstly have to be screwed off the bolts 20. In this process, the nuts may jam and not twist on the bolt while the bolt is twisted undesirably together with the nut under the influence of a torque applied to the nut.

The apparatus described in more detail below is used in order to prevent this from happening.

Figure 2:
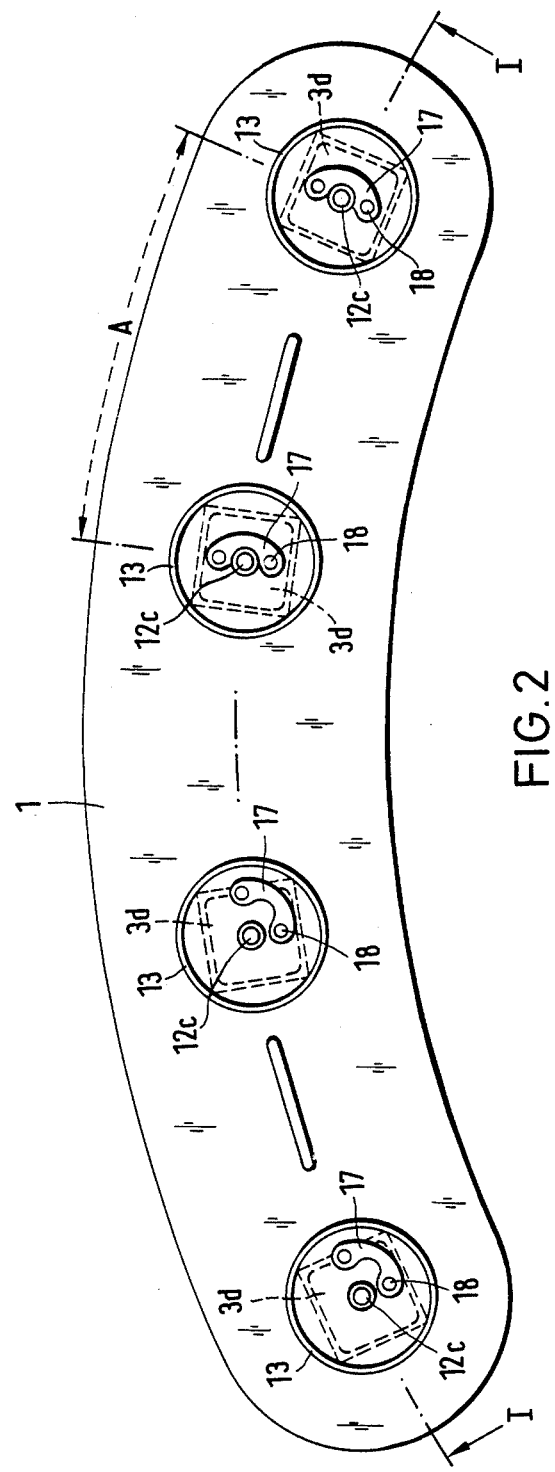
FIG. 2 shows a plan view of the apparatus.

A plate-shaped holder 1 with handles 2 is equipped with four tubular carriers 3 in the advantageous embodiment illustrated. The center-to-center distance A of the carriers 3 is equal to the axial distance between the screw bolts 20. Since the screw bolts are arranged over a circle of holes in the case indicated, the carriers 3 are also located at appropriate points over an arc of a circle in the holder. The holder can be curved in its external form, as shown in FIG. 2.

Each carrier 3 has a cylindrical pot-shaped lower portion 3a with internal teeth 4, a narrower cylindrical central portion 3b and, adjacent to a collar 3c, an upper projection 3d of approximately square external shape with lateral surfaces 5. The projection 3d penetrates through an opening 6 in the holder 1 limited by faces 7 (see FIG. 3), the opening 6 also having a square shape but being somewhat larger than the projection 3d so as to form a small gap. The carrier 3 consequently has slight angular mobility in the sense of rotation in one or other direction about its longitudinal axis L from the starting position shown in FIG. 3. Such a rotation is limited by the internal faces 7, which act as stops and against which the corner regions of the projection 3d can come to rest.

Figure 3:
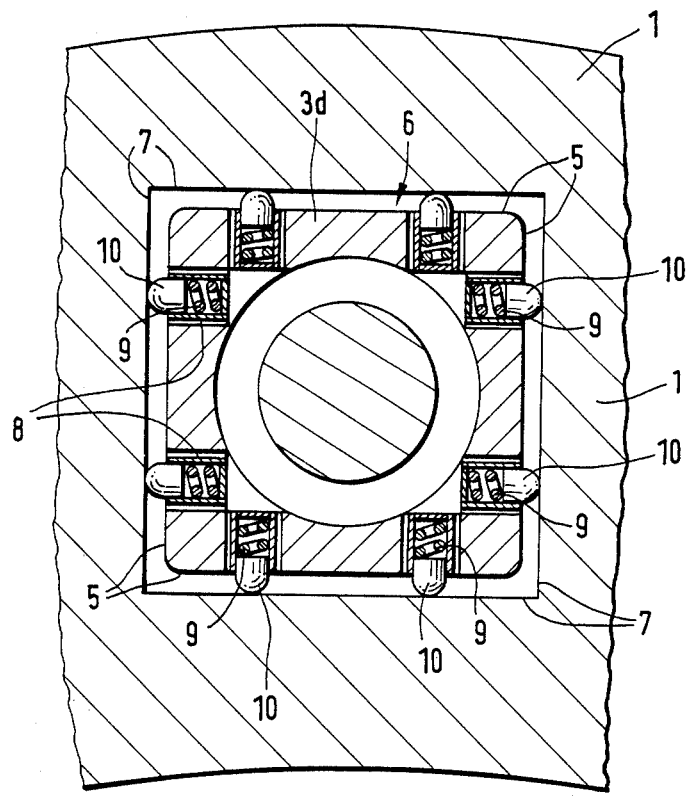
FIG. 3 shows a section along the line III—III in FIG. 1, on an enlarged scale.
Figure 4:
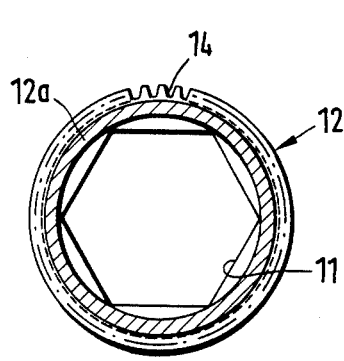
FIG. 4 shows a section through an adapter along line IV—IV in FIG. 1, on an enlarged scale.
Figure 5:
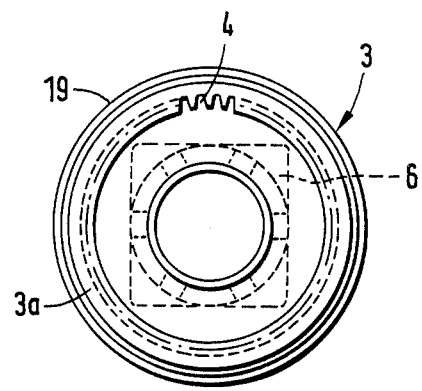
FIG. 5 shows an under-view of a carrier as seen in the direction of the arrow V in FIG. 1, on an enlarged scale.

In order to hold the carrier 3 centrally with respect to the opening 6 in the rest or starting position, thrust-bearing members 10 which are loaded by compression springs 9 and rest with their rounded heads on the internal surfaces 7 of the opening 6 are provided in transverse passages 8 in the projection 3d. In FIG. 3, the thrust-bearing members 10 are all shown as lying at the same level. However, an arrangement in two planes at different levels can be provided and this gives rise to particularly desirable centering and restoring forces.

A head piece 13 is detachably connected, for example by screws, to the end face of the projection 3d of each carrier 3 and, with a round shape, has a larger diameter than the opening 6 so that it rests on the upper side of the holder 1. The carrier 3 is thus suspended to a certain extent on the holder 1. The distance between the head member 13 and the collar 3c is somewhat larger than the thickness of the holder 1, allowing slight mobility of the carrier 3 relative to the holder 1 in an axial direction. However, it is also possible to fix the head pieces 13 detachably on the holder.

Adapters 12, which represent separate parts in themselves, can be coupled to the carriers 3 or to the holder 1. Each adapter 12 has a lower portion designed as a slip-on head 12a which, in the example illustrated, has an external hexagon 11 matching the external hexagon 21 at the upper end of each screw bolt 20. If the screw bolts have a different type of arrangement of (external or internal) spanner working surfaces, the design of opposing faces on or in the adapters is obviously correspondingly different. For example, a square or an oblong opening can be provided.

The slip-on head 12a of the adapter 12 is also provided with external teeth 14 with which the internal teeth 4 of the carrier 3 can mesh. The outer teeth 14 of the adapter 12 and/or the internal teeth 4 of the carrier 3 are preferably each tapered or bevelled at one end to allow particularly simple meshing.

A shaft 12b which extends through the carrier 3 in the service position of the apparatus shown in FIG. 1 and has a conical end 12c provided with an annular groove 15 passes from the slip-on head 12a of the adapter 12. A guide bush 16, in particular in the form of a roller or anti-friction arrangement of known type, which moves snugly on the shaft 12b when the carrier 3 is placed on the adapter 12 and centers both parts, is arranged in the carrier 3. This placement is simplified by the conical end 12c of the shaft.

A catch 17 is arranged pivotally about a pin 18 on the head piece 13 of the carrier 3 in such a way that it can be brought from a rest position (in the left-hand half of FIG. 2) to engage with the groove 15 of the shaft of the adapter 12 and therefore into a coupling position in which the adapter 12 is connected on the holder 1 and is entrained by it (FIG. 1 and right-hand half of FIG. 2).

The portion 3a of the carrier 3 has at its lower end an enlarged cylindrical protrusion 19 whose diameter is slightly smaller than the internal thread diameter of the nut 22 in such a way that it forms a guide member for the nut as the nut moves upwards when being unscrewed from the bolt 20.

The apparatus is handled in the following manner. First of all, the adapters 12, which are arranged in cassettes, for example for storage and transportation, are placed individually onto the hexagon 21 of each screw bolt 20 by hand. The holder 1 is then positioned and lowered with the carriers 3 also held, for example, by cassettes, the roller guides 16 or the like moving along the shafts 12b of the adapters 12 and the teeth 4 and 14 then meshing with each other. As already mentioned above, a slight rotation of the carrier 3 relative to the holder 1 is possible when the mutual position of the teeth 4 and 14 demands it. The angular mobility of the carrier 3 (projection 3d in the opening 6 in each case) need only be as large as required by the tooth spacing. In the final state, the carriers 3 rest with part of the internal end face of the pot-shaped lower portion 3a on the upper side of the slip-on head 12a or on a shoulder formed thereon, as shown in FIG. 1.

In this service position of the apparatus, the screw bolts 20 are held by the reciprocal torque support effected by means of the holder 1, the carriers 3, and the adapters 12; consequently they cannot rotate undesirably when the nuts 22 are released.

To remove the apparatus, the catches 17 are pivoted into the annular grooves 15 on the shaft ends 12c of the adapters 12 (right-hand part of FIG. 2). If the holder 1 is now raised by the handles 2, then the adapters 12 are removed from the screws bolts 20 with the other members. The nuts 22 can then be removed completely. The adapters 12 can be released by pivoting back the catches 17 and can be placed individually in their storage cassette.

The apparatus, in the embodiment illustrated, which is suitable, among other things, for use with heavy screw bolts, has a weight which is such that it can be handled by one man. According to the requirements, more or fewer than four carriers (a minimum of two carriers) can be provided in one holder.

All features mentioned in the foregoing description and illustrated in the drawings can be considered alone or in combinations as falling within the invention insofar as it is allowed by the known state of the art.

We claim:

1. Apparatus for preventing undesirable rotation of members having at one end surfaces engageable by a spanner, the members being arranged at a given mutual spacing, the apparatus comprising:

a plurality of adapters which can be positioned individually on the said one end of each said member, each adapter having inner and outer opposing surfaces, with said inner surface engageable onto said spanner-engageable surfaces and with said outer surface having external teeth;

a plurality of carriers which can be pushed onto the adapters, each carrier having internal teeth meshable with the said external teeth; and a holder mounting at least two said carriers, at a spacing corresponding to the said given mutual spacing, and with limited angular mobility;

the teeth between each adapter and the corresponding carrier, when meshed together, being in direct engagement so that rotation of the corresponding member by means of the adapter is prohibited.

2. The apparatus of claim 1, in which the holder mounts four said carriers.

3. The apparatus of claim 1, in which the carriers each extend through an opening in the holder with stop means for limiting the angular mobility.

4. The apparatus of claim 3, in which the stop means comprise internal surfaces of the opening.

5. The apparatus of claim 3, in which the opening has the form of a polygon and the carrier has a portion of corresponding shape with smaller dimensions.

6. The apparatus of claim 1, further comprising resilient centering means for positioning the carrier relative to the holder.

7. The apparatus of claim 6, in which the resilient centering means comprises spring-loaded thrust-bearing elements provided on the carrier and resting on internal surfaces of the holder.

8. The apparatus of claim 1, further comprising guiding means between the carriers and the adapters.

9. The apparatus of claim 8, in which each guide means has a roller or anti-friction guide arrangement.

10. The apparatus of claim 1, further comprising means for connecting the adapters to the holder, for them to be pulled by it.

11. The apparatus of claim 10, in which the connecting means comprise parts of the respective carriers supported by the holder and catches mounted on the respective carrier part.

12. The apparatus of claim 1, in which each carrier has a guide for a nut which can be unscrewed from the corresponding member.

* * * * *